Jan. 24, 1939.  H. H. B. LUND  2,145,052
FLOAT-OPERATED VALVE FOR ALLOWING INTERMITTENT SUPPLY OF LIQUID
Filed July 6, 1937   3 Sheets-Sheet 2
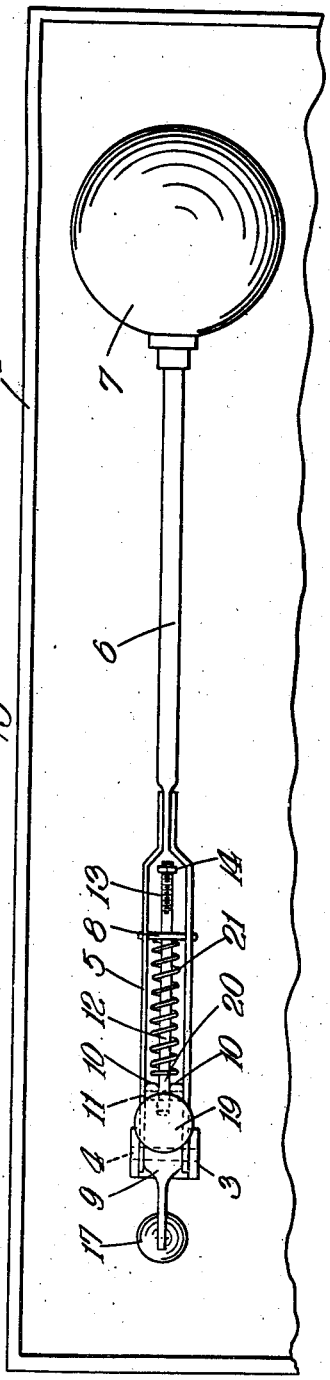
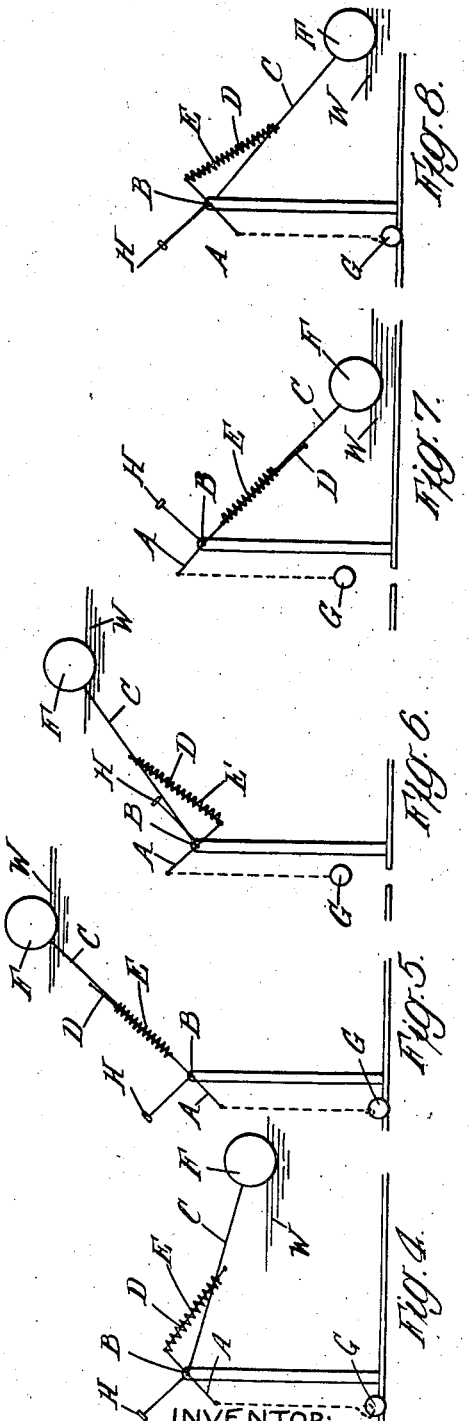
INVENTOR:
HENRY HILTON BLAIR LUND
BY Haseltine Lake & Co.
ATTORNEYS

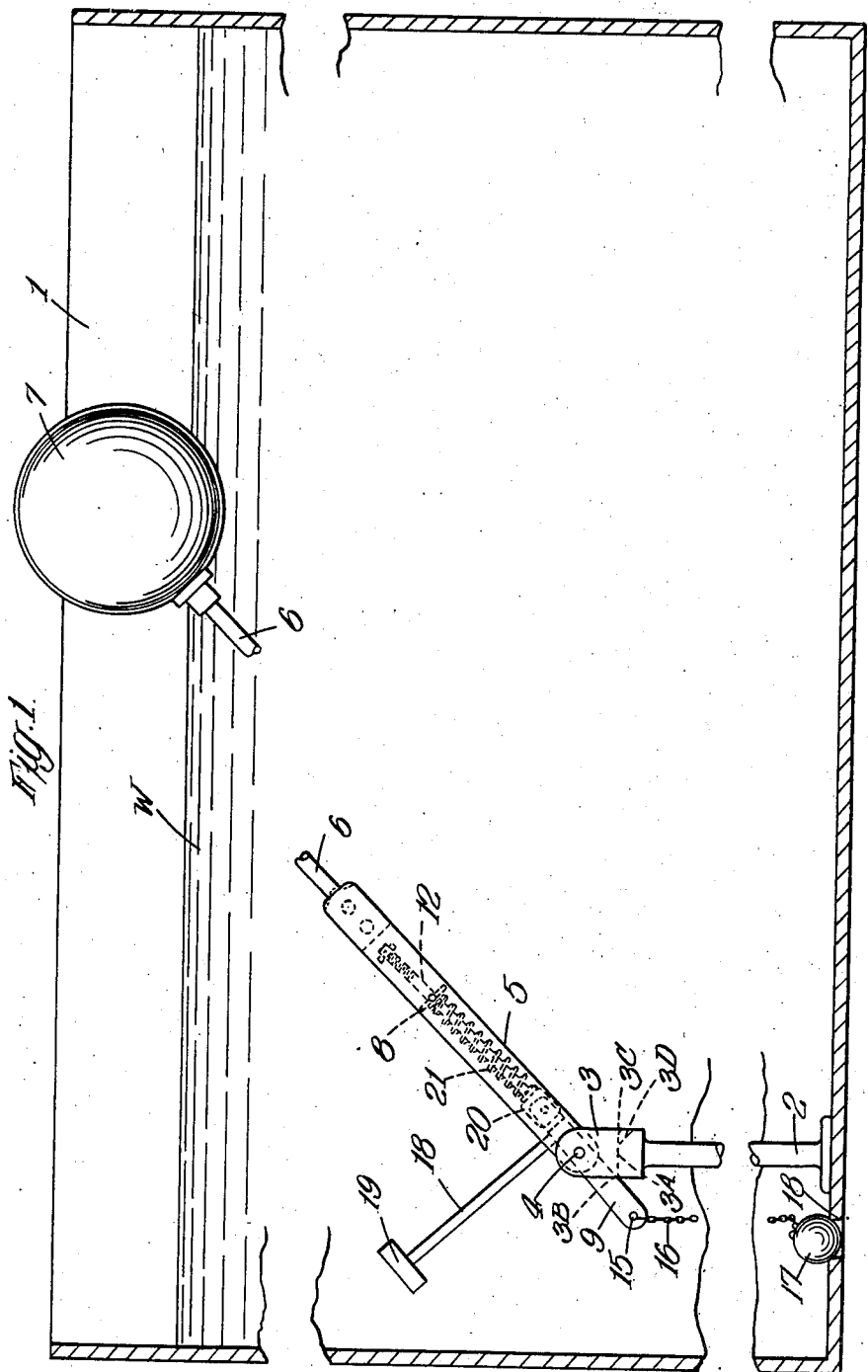

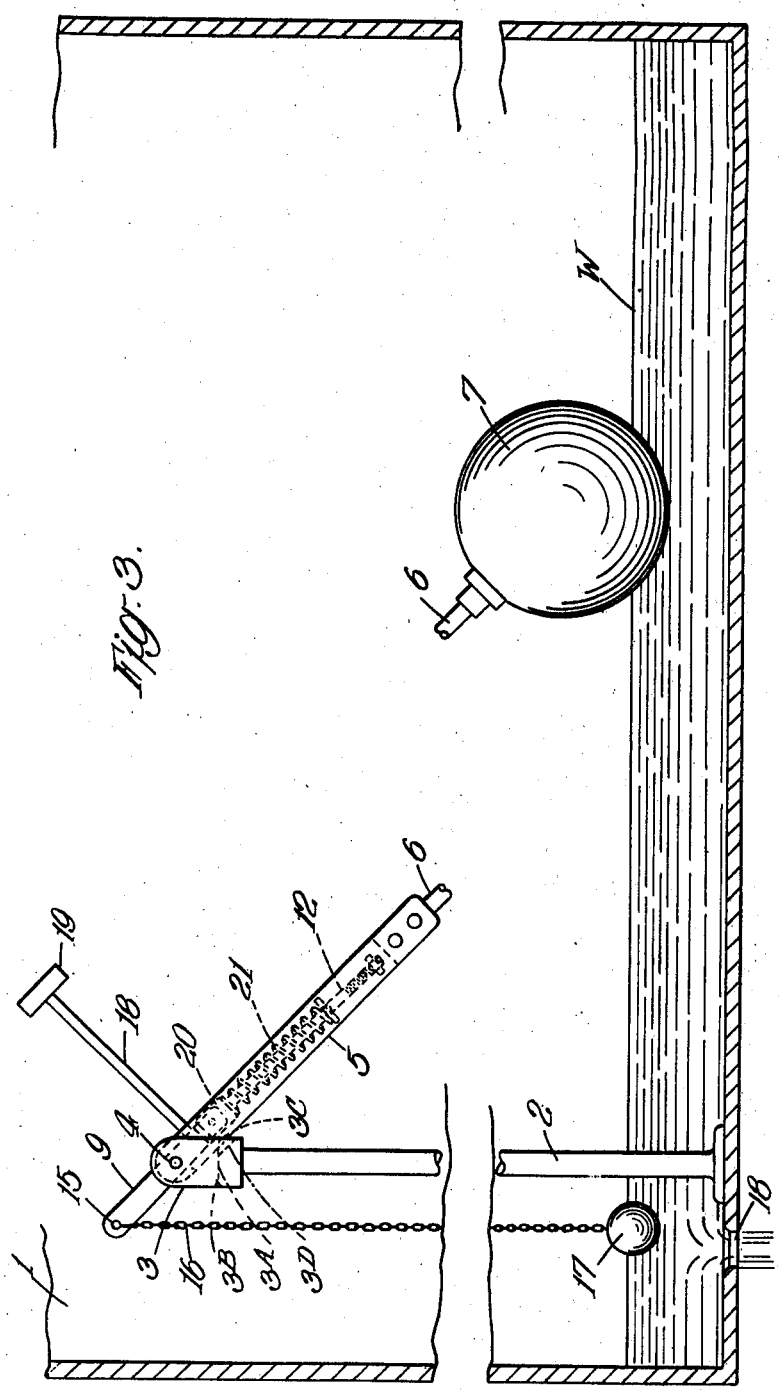

Patented Jan. 24, 1939

2,145,052

UNITED STATES PATENT OFFICE 2,145,052

FLOAT-OPERATED VALVE FOR ALLOWING INTERMITTENT SUPPLY OF LIQUID

Henry Hilton Blair Lund, Welwyn Garden City, England

Application July 6, 1937, Serial No. 152,267
In Great Britain July 6, 1936

1 Claim. (Cl. 137—139)

This invention relates to float operated valve mechanism for allowing intermittent supply of liquid and to mechanism of the type in which the float and valve are connected in such manner that when the float occupies an extreme position the valve similarly occupies an extreme position, there being an intermediate dead-centre position of the mechanism where the float is in a central position and the valve occupies either of its extreme positions, and where a spring is brought to maximum strain, such spring serving to accelerate the components of the mechanism away from the dead centre position thereof in either direction according to the direction in which the float may be slightly moved whereby a rapid change of position of the valve is obtained.

The invention is more particularly intended for use in connection with the supply of liquid to a soil-less cultivation cabinet in which the necessary fertilizer liquid is fed to trays located within the cabinet, through a sprinkler system. Such an arrangement forms the subject of my British Patent No. 472,873 of 1937. In accordance with the complete specification left in connection with my co-pending application just mentioned, a soil-less cultivation cabinet has the trays for the reception of the seeds or seedlings arranged in vertical groups, the trays being such that the liquid supplied to the uppermost tray may percolate therethrough and enter the lower trays successively. With such a system it becomes necessary to have a liquid supply which is arranged to feed liquid fairly rapidly to one or several sprinklers, at predetermined intervals of time.

It is the chief object of the invention to devise an improved float-operated valve mechanism of the type indicated, which will serve by the opening and closing movements of the valve, to control the outflow of liquid from a trough, so that the liquid may escape therefrom at a fairly rapid rate when the valve mechanism causes the valve to become unseated and, therefore, an aperture in the trough to be uncovered.

According to the invention a float operated valve mechanism of the type referred to has the valve controlled by a pivoted lever and the float carried by a swingable arm, both said lever and arm having a common pivotal support which is located between the ends of the lever. The valve is controlled by the end of said lever furthest from the swingable arm, the other end of such lever being hingedly connected with a member which is also hingedly connected with said arm, there being a compression spring arranged over said member, and the latter at one end being unrestrained against axial movement. Preferably, the lever has an additional mass secured to it, such mass being so relatively located as to tend always to hold the valve in one of its extreme positions when the valve occupies such position, but as the valve moves to an opposite working position the mass moves over a dead centre point and assists the valve to move completely to such opposite position.

With the arrangement in accordance with the invention, the mechanism is self-contained in that there is required only a single pivotal support for the mechanism, and the proper movement of the lever operating the valve does not depend upon external guides or mechanism other than that supported from said common pivotal support. This is of considerable importance, since for this reason a valve mechanism in accordance with the invention may be placed with minimum difficulty in fixing, in almost any kind of trough from which it is desired periodically, to expel liquid. Furthermore the substantial absence of guides, and the general simplicity of construction attendant upon carrying out the invention, leads to inexpensive manufacture of a highly satisfactory and durable mechanism.

In order that the invention may be clearly understood and readily carried into effect the same will now be described more fully with reference to the accompanying drawings, in which:—

Figure 1 is a sectional elevation through a trough provided with the float-operated control valve in accordance with the invention, certain parts of the trough and of the valve mechanism having been omitted for convenience of drawing;

Figure 2 is a plan view of that portion of the trough which contains the valve mechanism, such mechanism being shown in a different working position from that illustrated in Figure 1;

Figure 3 is a view similar to Figure 1 but shows yet a further working position of the valve mechanism, and Figures 4 to 8 show diagrammatically successive working positions of the valve mechanism.

Referring first to Figures 1 and 2 of the drawings, the valve mechanism is shown mounted within a trough or tank 1 which may be of considerable depth. To the inside lower wall of the trough 1, there is secured a standard 2 having a yoke end 3. A main pivot pin 4 passes through and is secured in the yoke 3 of the standard. The pivot pin 4 supports a clevis 5, to the free end of which is attached a bar 6 carrying a ball float 7. The arms of the clevis 5 pivotally support a swivel plate 8, and a short lever 9 has one of its ends also located between the arms of the clevis 5, such lever 9 being pivotally supported by the pivot pin 4. The end of the lever 9 within the clevis arms, is formed with a yoke portion 10 which receives a pivot 11 passing through a rod 12. The latter extends from the yoke portion 10, through the swivel plate 8 in which there is formed a central aperture. The end of the rod 12 passing through the swivel plate 8, is screw-threaded as at 13, and carries a nut 14 co-operating with such screw-threading. The lever 9 at its end remote from the yoke portion 10, is formed with an aperture 15 for the reception of the connecting link of a chain 16, such chain being also connected with a ball 17. The lever 9 carries at a point between the location of the pivot pin 4 and the yoke end 10, a rod 18 to the free extremity of which there is secured a weight 19.

The rod 12, as stated above, is received at one end in the yoke portion 10, and is pivotally connected thereto by means of the pivot 11. The part of the rod 12 which enters the yoke 10, is formed with a head portion 20 in the shape of the eye of an eye-bolt. A coil spring 21 is located between the swivel plate 18 and the shoulder formed on the rod 21 due to the head 20. The ball 17 secured to the end of the chain 16, is adapted to seat over an aperture 18 formed in the lower wall of the trough or tank 1. The latter is arranged to be supplied with water or other liquid W, which it is desired to release periodically through the aperture 18. It will be supposed in describing the operation of the mechanism, that liquid is constantly flowing into the trough through a dribble-cock, or like device.

Referring now to Figures 4 to 8 of the drawings, it will be observed that the lever 9 is here diagrammatically illustrated at A, the lever being pivotally arranged about a point B. The composite arm formed by the rod 6 carrying the ball float 7, and the clevis 5, is here represented as a single continuous arm C also pivoted around the point B. The counterpart of the rod 12 is indicated at D, there being the coil spring E arranged between the articulated end of the lever A and the point where the rod E is pivotally and slidably connected with the arm C. The ball float 7, ball valve 17 and weight 19 are respectively indicated at F, G and H. The height of the water, or other liquid, is indicated at W.

In Figure 4, the valve G is upon its seating, so that no, or a negligible amount of, liquid is escaping therethrough, and the float F will be rising due to the rising level of the liquid W. As the liquid level rises the arm C swings upwardly about the pivot point B to positions where the spring E is progressively further compressed. The maximum compression in the spring E is obtained when the arm C reaches a position of alignment with the lever A. Upon further upward movement of the float F after passing through the alignment position just referred to, the spring E remains almost at maximum compression, begins to exert a force on the lever A in a direction such as to tend to rotate such lever in a clockwise direction. In Figure 5 this working position is shown, where the alignment or dead centre arrangement of the lever A and arm C has been passed and the spring E begins to act in the opposite sense on the lever A. When the moment of the force due to the spring E has become sufficiently great by virtue of the upward movement of the float F, the lever A will be rapidly swung about its pivot point B under the action of such moment, the weight H being then displaced from a position in which it tends to oppose the moment due to the spring, to a position in which it aids such moment and assists in lifting the ball valve G clear of its seat. In Figure 6, the position of the mechanism is shown where the ball G has been lifted from its seat, the weight H having swung over and tending now to maintain the ball G off its seating. The liquid within the trough begins to run rapidly from the aperture normally closed by the ball G, and as the level of the liquid falls, the float F also falls and comes to a position where the spring E is again in maximum compression and the arm A and the lever B are almost in alignment. This position may be seen in Figure 7, and it will be understood that upon slight further downward movement of the float F, the lever A will be carried past its alignment position with respect to the lever B and the spring E will then tend to swing the lever B in anti-clockwise direction and, therefore, tend to return the ball valve G to its seat in the aperture in the lower wall of the trough. As before such movement of the lever B will be opposed by the weight H, but as soon as the movement has gone beyond a predetermined point, the weight H will assist and will add its moment to that of the spring and cause the ball valve G to be returned rapidly to its closed position. The returned position of the ball valve G is illustrated in Figure 8, and once more the liquid level in the trough begins to rise, and the cycle of operations will be passed through once more.

In Figure 1 it will be observed that the mechanism is in substantially the position indicated diagrammatically in Figure 5, whilst in Figure 3 the mechansm is substantially in the position indicated in Figure 7.

It will be appreciated from a study of Figures 4 to 8 that for the successful working of the mechanism, it will be desirable to have stops for limiting the movement of the lever A. Thus when the lever A is in its position shown in Figure 4 for example, when the float F is rising, there will be an increasing tendency for the lever A to be swung in anti-clockwise direction, whereas it is desirable that the lever A should move no further in anti-clockwise direction than is indicated. Similarly in the opposite position of the lever A as is indicated in Figures 6 and 7, it is undesirable that the lever A should here be able to move further in clockwise direction. In practice (referring to Figures 1 to 3), the yoke member 3 may be formed with abutting stops to co-operate with the lever 9, but by correct proportioning of the yoke member 3 the lower wall of the yoke may afford the desired stop. Such lower wall is indicated at 3A in Figures 1 and 3, and it will be seen that it is necessary only to make such lower wall extend up a sufficient height to engage and limit the movement of, the lever 9. The wall 3A is rounded over and engages the lever 9 at 3B when the mechanism is in the working position illustrated in Figure 1. In order that the lever 9 may be limited in its movement towards its other extreme position, the edge 3C of the bottom wall 3A is grooved as at 3D to allow the clevis 5 to move after the lever 9 is positively restrained from further movement.

What I claim and desire to secure by Letters Patent of the United States is:—

A storage trough for the periodic supply of a predetermined body of fertilizer liquid to a plurality of trays of a cultivation cabinet, an outlet in the lower wall of the trough, an obturating member which may seat over the aperture in said outlet, a flexible connection between said obturating member and one end of a fulcrumed lever, a member fixed within the trough to afford the fulcrum for said lever, an arm pivotally connected to said member, an element hingedly attached to the end of said lever opposite from that flexibly connected to the obturating member, a connection between said element and said arm, such connection being hinged and also permitting of axial movement of said element with respect to the arm, a compression spring arranged over said element and exerting a force between the two points of hinged connection of said element, a rod secured to said fulcrumed lever, said rod projecting from the lever at a point offset from the fulcrum thereof and carrying at its free end a weight which will have a small moment about the pivot of the fulcrumed lever when the latter is substantially horizontal, but which will have a considerable moment about such pivot when the lever is inclined.

HENRY HILTON BLAIR LUND.